(12) United States Patent
Bucks

(10) Patent No.: US 9,364,907 B2
(45) Date of Patent: Jun. 14, 2016

(54) JIGSAW BLADE

(75) Inventor: Brent L. Bucks, Lakewood Ranch, FL (US)

(73) Assignee: Black & Decker Inc., New Britain, CT (US)

( * ) Notice: Subject to any disclaimer, the term of this patent is extended or adjusted under 35 U.S.C. 154(b) by 1514 days.

(21) Appl. No.: 12/327,145

(22) Filed: Dec. 3, 2008

(65) Prior Publication Data

US 2009/0144992 A1    Jun. 11, 2009

Related U.S. Application Data

(60) Provisional application No. 61/007,241, filed on Dec. 11, 2007.

(51) Int. Cl.
*B26B 9/02* (2006.01)
*B23D 61/12* (2006.01)

(52) U.S. Cl.
CPC ............ *B23D 61/121* (2013.01); *B23D 61/128* (2013.01)

(58) Field of Classification Search
CPC ................................ B23D 61/128; B23B 9/02
USPC ........... 83/835, 846, 697, 853, 837, 847, 848;
30/355, 392, 503, 503.5, 353, 356,
30/357; D8/20, 70, 9, 14
See application file for complete search history.

(56) References Cited

U.S. PATENT DOCUMENTS

| 349,143 | A | | 9/1886 | Clemson | |
|---|---|---|---|---|---|
| 2,646,094 | A | | 7/1953 | Russell | |
| 2,890,728 | A | | 6/1959 | Craven | |
| 3,033,251 | A | * | 5/1962 | Atkinson et al. | 83/835 |
| 3,111,970 | A | | 11/1963 | Priest et al. | |
| 3,186,726 | A | * | 6/1965 | Wilhelm et al. | 279/83 |
| 3,314,456 | A | * | 4/1967 | Craven | 83/837 |
| 3,357,462 | A | * | 12/1967 | Craven | 83/854 |
| 3,374,815 | A | * | 3/1968 | Anderson, Jr. et al. | 83/852 |
| 3,477,479 | A | | 11/1969 | Doty | |
| 3,680,610 | A | | 8/1972 | Lindgren | |

(Continued)

FOREIGN PATENT DOCUMENTS

| DE | 1503939 A1 | 9/1969 |
|---|---|---|
| DE | 1 503 939 | 3/1971 |

(Continued)

OTHER PUBLICATIONS

Search Report—European Patent for related application EP08171265.5.

(Continued)

*Primary Examiner* — Ghassem Alie
(74) *Attorney, Agent, or Firm* — Scott B. Markow

(57) ABSTRACT

A jigsaw blade has an elongated body with a first and second end, a cutting edge and an opposing back edge. A plurality of teeth is formed on the cutting edge. The first tooth of the plurality of teeth is immediately adjacent the second end of the blade. The first tooth is raker tooth and has a rake face and a clearance face. The rake face and clearance face intersect to form a cutting edge of the first tooth. The second end defines a plunging nose. The second end includes a nose end surface that extends between the cutting edge and the back edge. The nose end surface is on an angle of about 35° with respect to a line defined by tips of the plurality of teeth. The nose end surface intersects the first tooth relief surface to form an angled cutting edge with a leading sharp point.

18 Claims, 5 Drawing Sheets

(56) References Cited

U.S. PATENT DOCUMENTS

| | | | |
|---|---|---|---|
| 3,837,024 A * | 9/1974 | Saunders | 7/144 |
| 3,964,163 A | 6/1976 | Russo | |
| 4,015,331 A * | 4/1977 | Balke | 30/355 |
| 4,027,390 A | 6/1977 | Kendzior | |
| 5,095,623 A * | 3/1992 | Williams | 30/144 |
| 5,119,708 A | 6/1992 | Musgrove | |
| 5,295,426 A * | 3/1994 | Planchon | 83/846 |
| 5,517,889 A | 5/1996 | Logan | |
| 5,855,158 A | 1/1999 | Donofrio | |
| 5,884,547 A | 3/1999 | Carlsen et al. | |
| 5,918,525 A | 7/1999 | Schramm | |
| 6,105,260 A * | 8/2000 | Parrish et al. | 30/331 |
| 6,125,544 A | 10/2000 | Eriksson et al. | |
| 6,244,152 B1 | 6/2001 | Di Nicolantonio | |
| 6,357,122 B2 * | 3/2002 | Bachta | 30/355 |
| 6,401,585 B1 * | 6/2002 | Morgan | 83/835 |
| 6,427,573 B1 | 8/2002 | Carlsen et al. | |
| 6,601,495 B2 | 8/2003 | Cranna | |
| 6,782,781 B2 | 8/2004 | Rack | |
| 7,127,979 B2 | 10/2006 | Kocher et al. | |
| 7,174,823 B2 | 2/2007 | Cranna | |
| 7,225,714 B2 | 6/2007 | Rompel et al. | |
| D565,369 S * | 4/2008 | Dawson | D8/20 |
| 8,033,026 B2 | 10/2011 | Gibbons et al. | |
| 2002/0184988 A1 | 12/2002 | Rohman et al. | |
| 2003/0051593 A1 | 3/2003 | Kocher et al. | |
| 2005/0211046 A1 | 9/2005 | Thomas et al. | |
| 2008/0172890 A1 * | 7/2008 | Shetterly | 30/355 |

FOREIGN PATENT DOCUMENTS

| | | | |
|---|---|---|---|
| DE | 88 05 767 | 7/1998 | |
| DE | 10300392 A1 | 7/2004 | |
| DE | 20 2004 017 351 | 4/2006 | |
| EP | 0 786 302 B2 | 12/1996 | |
| JP | 06091601 A * | 4/1994 | B27B 19/12 |

OTHER PUBLICATIONS

Summons to Attend Oral Proceedings Pursuant to Rule 115(1) EPC regarding corresponding European Patent Application No. 08171265.5—Sep. 24, 2014—2 pages—Munich Germany.

Frisch, Ulrich—Examination Report regarding corresponding European Patent Application No. 081712655-1702—Jul. 7, 2013—4 pages.

* cited by examiner

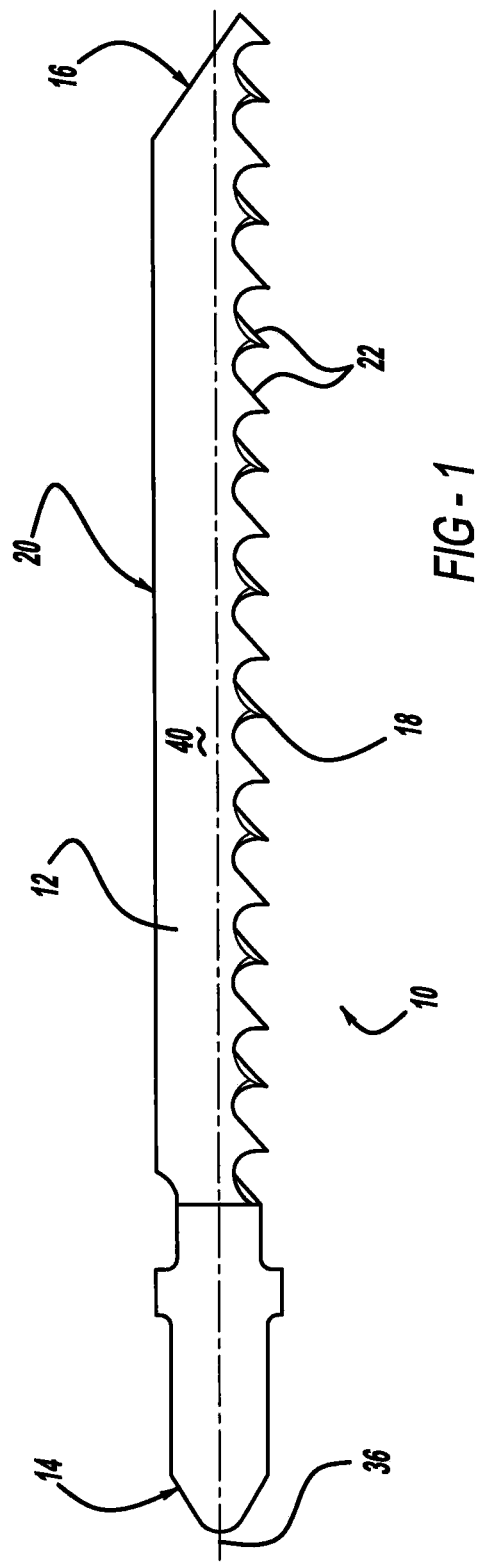
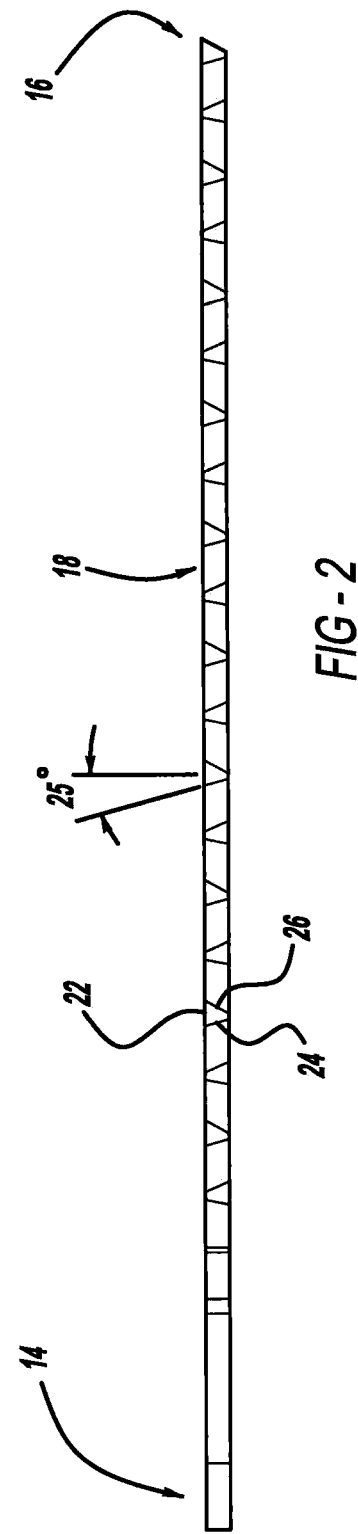

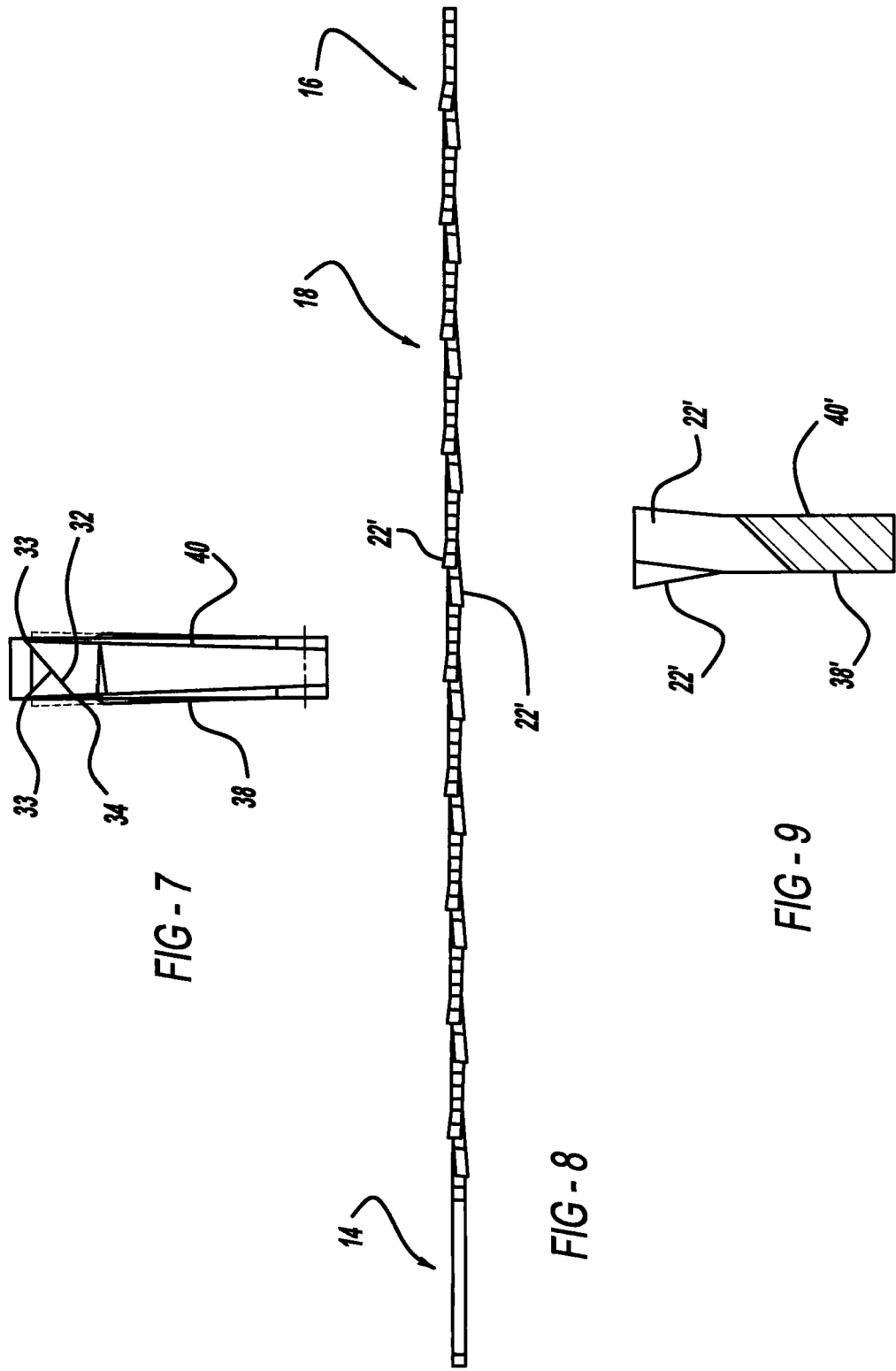

JIGSAW BLADE

CROSS-REFERENCE TO RELATED APPLICATIONS

This application claims the benefit of U.S. Provisional Application No. 61/007,241, filed on Dec. 11, 2007. The entire disclosure of the above application is incorporated herein by reference.

FIELD

The present disclosure relates to jigsaw blades and, more particularly, to a jigsaw blade with a plunge nose cutting tip.

BACKGROUND

Jigsaws are used for various types of cutting. Generally, a jigsaw may be utilized wherein a first cut is plunged into a workpiece. Accordingly, when this type of cut occurs, it is important that the jigsaw cut the workpiece as soon as possible. In a number of applications, a pilot hole is drilled and the jigsaw blade is placed into the pilot hole to begin cutting of the workpiece. When the workpiece is plunged, if the jigsaw blade does not enter into the workpiece, it may move left or right and start an enlarged kurf. Alternatively, the jigsaw blade may mar the workpiece. Marring is a big problem when finishing wood, used for cabinets, doors or drawers, is being cut by the jigsaw blade. Accordingly, it is desirable to have a jigsaw blade, when it is plunged into a workpiece, start a kurf to provide a desired cut.

SUMMARY

The present jigsaw blade provides the art with a jigsaw blade that provides additional room for swarf in the kurf. The first tooth of the blade cuts a kurf into the workpiece. Additional teeth remain in the kurf to continue cutting of the workpiece. The first tooth pilots the blade along the workpiece. The first tooth is a raker tooth and draws straight into the workpiece and does not move left or right during entrance into the workpiece. The present jigsaw blade creates a clearance for its nose as it is plunged into the workpiece. Additionally, the jigsaw blade provides a full tooth at the front end of the blade.

Accordingly to a first aspect of the disclosure, a jig saw blade comprises an elongated body with a first and second end. A cutting edge and an opposing back edge are formed on the elongated body. The first end is a shanking end to secure the jigsaw blade with a jigsaw. A plurality of teeth is formed on the cutting edge. A first tooth of the plurality of teeth is immediately adjacent the second end. The first tooth is a full raker tooth. The first tooth has a rake face and a clearance face. The rake face and the clearance face intersect one another to form a cutting edge of the first tooth. The second end defines a plunging nose. The second end includes a nose edge surface that extends between the cutting and back edges. The nose edge surface is on an angle of about 35° with respect to a line defined by the tips of the plurality of teeth. The nose edge surface intersects the first tooth relief surface to form a cutting edge with a sharp point and a bevel edge. Thus, during plunge cutting, the sharp point begins cutting of a workpiece forming a kurf in the workpiece. The remainder of the plurality of teeth is fleam teeth. The elongated body includes a pair of major faces between the cutting and back edges. The major faces are each angled from the cutting edge to the back edge inwardly on an angle of about 2°. The clearance face and the nose edge surface define an included angle of about 76°. Additionally, the first tooth is ground to provide a fleam tooth.

According to a second aspect of the disclosure, a saw blade comprises an elongated body with a first and second end. A cutting edge and an opposing back edge are formed on the body. A pair of major sides is between the cutting and back edge. The first end is a shanking end to secure the jigsaw blade with a jigsaw. A plurality of teeth is formed on the cutting edge. The plurality of teeth is fleam teeth. The fleam angle of the teeth is about 25° with respect to a plane perpendicular to the longitudinal axis of the blade. The first tooth of the plurality of teeth is immediately adjacent the second end. The first tooth is a full raker tooth. The first tooth is also a fleam tooth and has a rake face and a clearance face intersecting to form a cutting edge. The second end defines a plunging nose. The second end includes a nose edge surface extending between the cutting and back edges. The nose edge surface is on an angle of about 35° with respect to a line defined by the tips of the plurality of teeth. The nose edge surface intersects the first tooth relief surface to form a cutting edge with a sharp point and a beveled edge. The included angle formed between the first tooth relief face and the nose edge surface has an angle value of about 42° to about 46°. The relief surface acts as a rake face so that during plunge cutting, the sharp point begins to cut a kurf into the workpiece. The major faces are angled from the cutting edge to the back edge inwardly on an angle of about 2°. Also, the included angle between the clearance face and the nose edge surface is on an angle of about 76°

Further areas of applicability will become apparent from the description provided herein. It should be understood that the description and specific examples are intended for purposes of illustration only and are not intended to limit the scope of the present disclosure.

DRAWINGS

The described drawings are for illustration purposes only and are not intended to limit the scope of the present disclosure in any way.

FIG. 1 is a side elevation view of a jigsaw blade.

FIG. 2 is a perspective view of the blade of FIG. 1 rotated 90°.

FIG. 7 is a cross-sectional view of the blade of FIG. 1 through line 7-7.

FIG. 8 is a view like FIG. 2 of an additional embodiment of the present disclosure.

FIG. 9 is a cross-section view of FIG. 8.

DETAILED DESCRIPTION

Figure 3:
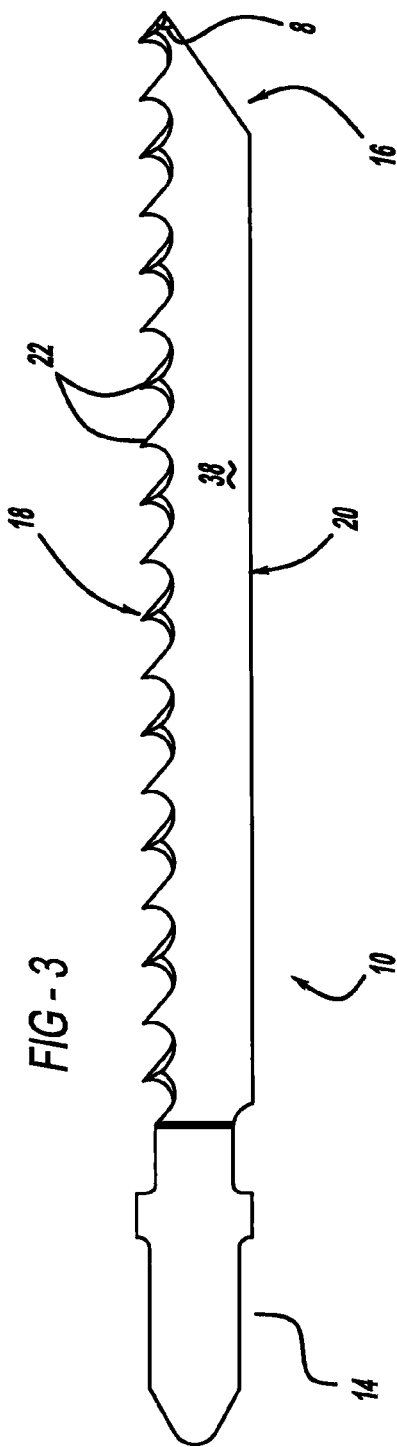
FIG. 3 is a side elevation view of FIG. 1 rotated 180°.

The following description is merely exemplary in nature and is not intended to limit the present disclosure, application, or uses.

Turning to the figures, a jigsaw blade is illustrated and identified with the reference numeral 10. The blade 10 includes an elongated body 12 with a first end 14 and a second end 16. The first end 14 is a shanking end that enables the jigsaw blade 10 to be secured with a jigsaw (not shown). The body 12 includes a cutting edge 18 and an opposing back edge 20. The cutting edge 18 includes a plurality of teeth 22.

The plurality of teeth 22 is fleam teeth to provide alternating teeth for cutting in a left direction, right direction, left direction, right direction. Thus, as illustrated in FIGS. 1 and 3, every other tooth is illustrated with a pair of bevel surfaces 24, 26 on a desired fleam angle. The tooth 22 is beveled at a fleam angle of about 25° in both directions with respect to a plane perpendicular to the longitudinal axis 36 of the blade. Thus, the blade is ground in both directions to establish left and right cutting teeth as illustrated in FIGS. 1-3.

Figure 4:
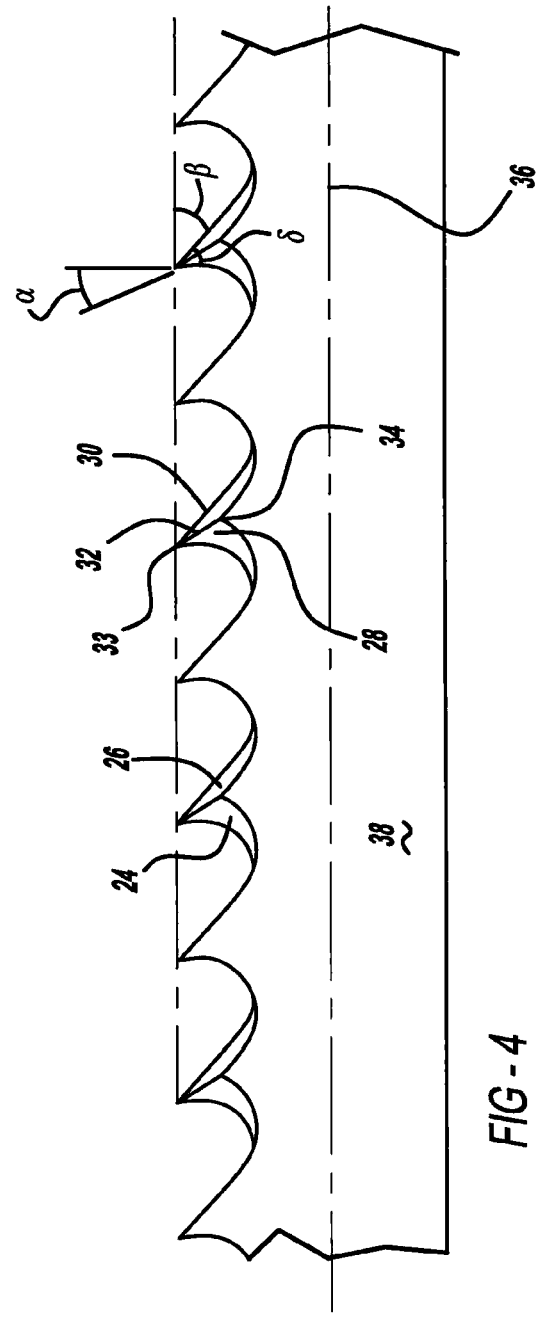
FIG. 4 is an enlarged view of a portion of FIG. 1 illustrating the cutting edge.

Each tooth has a rake face 28 and relief face 30 as seen in FIG. 4. The rake face 28 and relief face 30 intersect one another to form the cutting edge 32 of the tooth 22. The cutting edges 32 are angled and include leading tips 33 and trailing tips 34. The teeth are the same size such that the leading tips 33 define a line substantially parallel to the axis 36 of the jigsaw blade. The rake face 28 is at a rake angle β of about 0° to 15°, and preferably about 5°. The relief face 30 is at a clearance angle β of about 45° to 55°, and preferably 49°. The included angle γ defined between the rake face and the relief face is about 30° to 55°, and preferably at about 44°.

By having alternating teeth facing in an opposite direction, every other tooth on its major face 38, 40 cuts into the same side of the kurf. Thus, one set of teeth on major face 38 cuts the left side and the other set of teeth on major face 40 cuts the right side of the kurf.

The body includes a pair of major faces 38 and 40. The major faces 38 and 40 are angled inwardly from the cutting edge 18 toward the back edge 20 at an angle of about 1° to 3°, and preferably at about 2° on each side of the major face. Thus, a total of 2° to 6°, preferably 4°, of a back taper angle is on the saw blade. This is best illustrated in FIG. 7. The back taper provides a clearance for the saw blade 10 to enable the saw blade 10 to move around curves as the saw blade 10 is moved through a workpiece.

Figure 5:
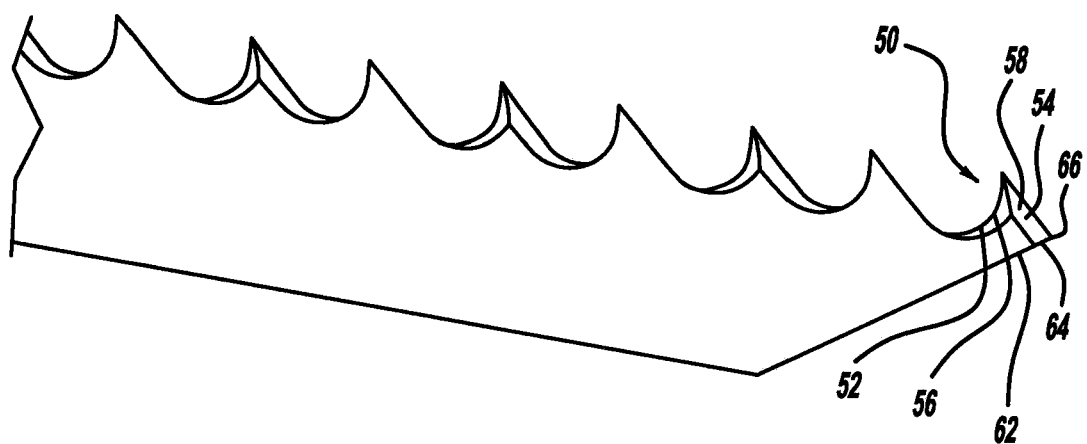
FIG. 5 is an enlarged perspective view of the nose end of the blade of FIG. 1.
Figure 6:
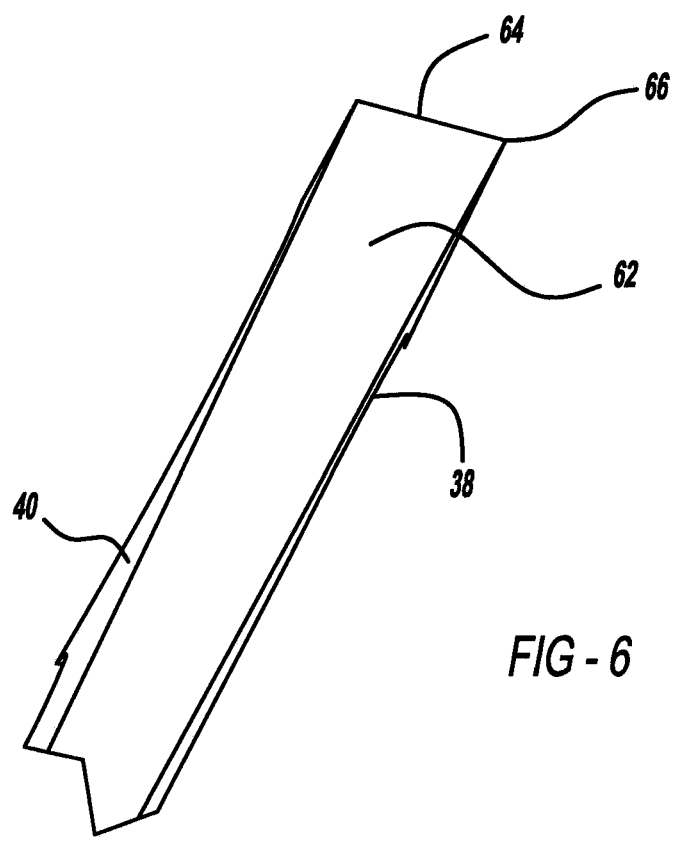
FIG. 6 is an enlarged top plan view of FIG. 5.

Turning to FIG. 5, the first tooth 50 immediately adjacent to the plunging nose end 16 is illustrated. The first tooth 50 is a fleam tooth and is unset or is a raker tooth. The fleam angles on the bevel surfaces 52, 54 are the same as those on the other teeth. Also, the first tooth 50 is a full tooth having the same size as the remainder of the plurality of teeth 22. Thus, the rake face 56, as well as the relief face 58, is the same as those previously described.

The relief face 58 terminates at the plunge nose 60. The plunge nose 60 includes an end surface 62. The end surface 62 is on an angle at about 30° to 45° and preferably about 35° to the longitudinal axis of the saw blade 10. This provides clearance for the end surface of the plunge nose 60 when it is plunged into a workpiece. The bevel edge 58 of the fleam of the first tooth 50 extends to the nose end surface 62 to form a cutting edge 64 at the nose tip of the saw blade. The cutting edge 64 utilizes the relief face 58 of the first tooth 50 as its rake face. The cutting edge 64 is curved or angled between the major sides 38, 40 to provide a leading point 66. An included angle is formed between the first tooth relief face 58 and the end surface 62. The included angle δ is about 66° to 96° and preferably about 76°. The bevel grind of the fleam provides a sharp cutting edge 64 as well as leading point 66. Accordingly, when the nose 60 is plunged into a workpiece, the point 66 and cutting edge 64 acts as a cutting tooth to initially cut into the workpiece to start a kurf. Thus, the saw blade 10 draws straight into the workpiece without moving left or right or marring the workpiece surface.

Figure 10:
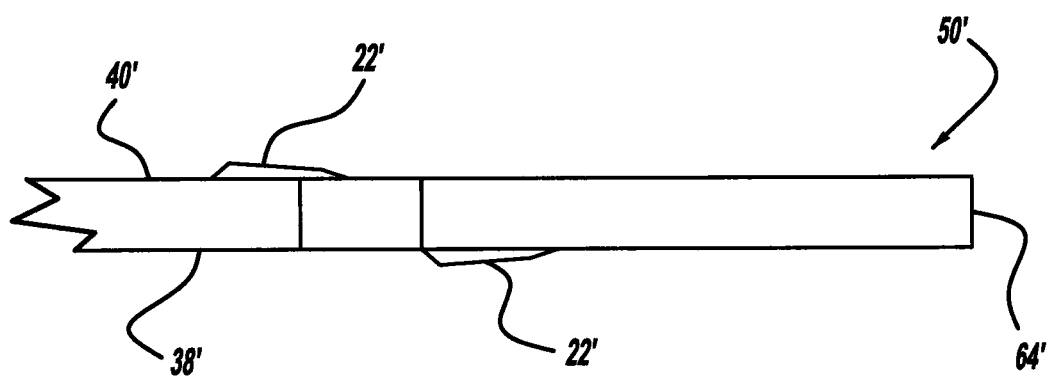
FIG. 10 is an enlarged top plan view of the blade of FIG. 8.

Turning to FIGS. 8-10, an additional embodiment is illustrated. Here, the saw blade is identical to that previously discussed except the saw blade is not beveled and thus, does not include the taper on the major faces 38', 40'. Here, the saw blade includes the major faces 38', 40' parallel to one another as illustrated in FIG. 9. The plurality of teeth 22' is offset with respect to one another and include cutting edges 32' perpendicular to the major faces 38', 40'. Thus, major face 38' includes all teeth set left with the adjacent tooth on the major face 40' all set right. The first tooth 50', however, is unset or is a raker tooth as previously described. The first tooth 50' is milled. Thus, the cutting edge 64' is perpendicular to the major face 38', 40' and is straight without a leading or trailing point as seen in FIG. 10 The set on the teeth 22' acts to provide clearance for the back edge 20 of the jigsaw 10 so that it may be negotiated around curves during cutting of the jigsaw blade 10.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A jigsaw blade comprising:
   an elongated body having a first end and a second end, a blade cutting edge and an opposing, toothless back edge extending from the first end to the second end, said first end being a shanking end for securing the jigsaw blade with a jigsaw;
   a plurality of teeth formed on said blade cutting edge, a first tooth of said plurality of teeth is immediately adjacent said second end, said first tooth being a full tooth, said first tooth being a raker tooth, said first tooth having a rake face and a relief face, said rake face and relief face intersecting one another forming a first tooth cutting edge;
   said second end defining a plunging nose, said second end including a substantially straight nose end surface extending between said relief face and said back edge, said nose end surface being on an angle of 30° to 45° at an intersection of the nose end surface and the first tooth relief surface with respect to a line defined by tips of said plurality of teeth, said nose end surface intersecting said first tooth relief surface to form the nose cutting edge with a sharp leading point so that during plunge cutting with said jigsaw blade, said sharp leading point initiates cutting of a workpiece.

2. The jigsaw blade according to claim 1 wherein a remainder of said plurality of teeth being fleam teeth.

3. The jigsaw blade according to claim 1, wherein said angle of said nose end surface is about 35°.

4. The jigsaw blade of claim 1, wherein said elongated body includes a pair of major faces between said cutting and back edges said major faces are each angled from said blade cutting edge to said back edge on an inward angle of about 2°.

5. The jigsaw blade of claim 1, wherein said clearance face and nose end surface define an included angle of about 66° to 96°.

6. The jigsaw blade of claim 5, wherein said included angle being about 76°.

7. The jigsaw blade of claim 1, wherein said first tooth being a fleam tooth.

8. A jigsaw blade comprising:
   an elongated body having a first end and a second end, a blade cutting edge and an opposing, toothless back edge extending from the first end to the second end, said first end being a shanking end for securing the jigsaw blade with a jigsaw;
   a plurality of teeth formed on said blade cutting edge, said plurality of teeth being fleam teeth, a first tooth of said plurality of teeth is immediately adjacent said second end, said first tooth being a full tooth, said first tooth being a raker tooth, said first tooth having a rake face and a relief face, said rake face and relief face intersecting one another forming a first tooth cutting edge;

said second end defining a plunging nose, said second end including a substantially straight nose end surface extending between said relief face and said back edge, said nose end surface being on an angle of 30° to 45° at an intersection of the nose end surface and the first tooth relief surface with respect to a line defined by tips of said plurality of teeth, said nose end surface intersecting said first tooth relief surface to form an angled cutting edge having a leading edge portion and a trailing edge portion, said leading edge portion forming a sharp point, an inclusion angle is formed between said first tooth relief face and said nose end surface having an angle of about 66° to 96°, said relief surface acting as a rake face so that during plunge cutting with said jigsaw blade, said sharp point initiates cutting of a workpiece.

9. The jigsaw blade of claim 8, wherein the blade body has first and second major faces each angled from said cutting edge to said back edge on an inward angle of about 2°.

10. The jigsaw blade of claim 8, wherein said included angle being about 76°.

11. The jigsaw blade of claim 8 wherein said remaining plurality of teeth are offset with respect to one another.

12. The jigsaw blade of claim 1, wherein the body includes a first major face and a second major face, each extending between the blade cutting edge and the back edge, and the nose cutting edge extends generally transverse to the first and second major faces.

13. The jigsaw blade of claim 12, wherein the nose cutting edge extends from the first major face to the second major face.

14. The jigsaw blade of claim 13, wherein the sharp leading point is formed at an intersection between the nose cutting edge and the first major face.

15. The jigsaw blade of claim 8, wherein the body includes a first major face and a second major face, each extending between the blade cutting edge and the back edge, and the angled cutting edge extends generally transverse to the first and second major faces.

16. The jigsaw blade of claim 15, wherein the angled cutting edge extends from the first major face to the second major face.

17. The jigsaw blade of claim 16, wherein the sharp point is formed at an intersection between the angled cutting edge and the first major face.

18. A jigsaw blade comprising:

an elongated body having a first end and a second end, a blade cutting edge and an opposing, toothless back edge extending from the first end to the second end, and a first major face and a second major face, each extending between the blade cutting edge and the back edge, said first end being a shanking end for securing the jigsaw blade with a jigsaw;

a plurality of teeth formed on said blade cutting edge, a first tooth of said plurality of teeth is immediately adjacent said second end, said first tooth being a full tooth, said first tooth being a raker tooth, said first tooth having a rake face and a relief face, said rake face and relief face intersecting one another forming a first tooth cutting edge;

said second end defining a plunging nose, said second end including a substantially straight nose end surface extending between said relief face and said back edge, said nose end surface being at an angle with respect to a line defined by tips of said plurality of teeth, said nose end surface intersecting said first tooth relief surface to form a nose cutting edge with a sharp leading point so that during plunge cutting with said jigsaw blade, said sharp leading point initiates cutting of a workpiece, wherein said nose cutting edge extends generally transverse to the first and second major faces.

\* \* \* \* \*